US007789144B2

(12) United States Patent
Dahanayake et al.

(10) Patent No.: US 7,789,144 B2
(45) Date of Patent: Sep. 7, 2010

(54) METHODS FOR RECOVERING OIL FROM AN OIL RESERVOIR

(75) Inventors: Manilal S. Dahanayake, Princeton Junction, NJ (US); Bruno Langlois, Paris (FR); Paul-Joel Derian, Villennes sur Seine (FR); Jean-Pierre Marchand, Lyons (FR)

(73) Assignee: Rhodia, Inc., Cranbury, NJ (US)

( * ) Notice: Subject to any disclaimer, the term of this patent is extended or adjusted under 35 U.S.C. 154(b) by 0 days.

(21) Appl. No.: 12/290,392

(22) Filed: Oct. 30, 2008

(65) Prior Publication Data

US 2009/0065204 A1 Mar. 12, 2009

Related U.S. Application Data

(63) Continuation of application No. 11/280,896, filed on Nov. 16, 2005, now Pat. No. 7,461,694.

(51) Int. Cl.
*E21B 43/26* (2006.01)
*E21B 43/22* (2006.01)

(52) U.S. Cl. .................. 166/270.1; 166/300; 166/305.1

(58) Field of Classification Search ...................... None
See application file for complete search history.

(56) References Cited

U.S. PATENT DOCUMENTS

| | | | | |
|---|---|---|---|---|
| 3,199,586 | A | 8/1965 | Henderson et al. | |
| 3,292,698 | A | 12/1966 | Savins | |
| 3,302,713 | A | 2/1967 | Ahearn et al. | |
| 4,970,007 | A | 11/1990 | Miller et al. | |
| 5,979,555 | A | 11/1999 | Gadberry et al. | |
| 6,258,859 | B1 | 7/2001 | Dahanayake et al. | |
| 6,435,277 | B1 | 8/2002 | Qu et al. | |
| 6,703,352 | B2 | 3/2004 | Dahanayake et al. | |
| 6,831,108 | B2 | 12/2004 | Dahanayake et al. | |
| 7,373,977 | B1 * | 5/2008 | Berger et al. | 166/270.1 |
| 2007/0142235 | A1 | 6/2007 | Berger et al. | |

OTHER PUBLICATIONS

Hoffmann et al., "The Rheoloical Behaviour of Different Viscoelastic Surfactant Solutions," Tenside Surf. Det., 31, pp. 289-400, 1994.

"Rheological Measurements," Encyclopedia of Chemical Technology, vol. 21, pp. 347-372 (John Wiley & Sons, Inc., N.Y., N.Y., 1997, 4th ed.).

* cited by examiner

*Primary Examiner*—Zakiya W Bates
*Assistant Examiner*—Angela M DiTrani
(74) *Attorney, Agent, or Firm*—Ohlandt, Greeley, Ruggiero & Perle, LLP

(57) ABSTRACT

There is a method for enhancing the recovery of oil from a reservoir. The method has the step of a) introducing a flooding fluid into the reservoir and b) extracting the oil through a wellbore at a location different than the point of introduction of the flooding fluid into the reservoir. The flooding fluid has water and an amount of one or more non-polymeric viscoelastic surfactants sufficient to provide an interfacial surface tension of about 1 mNm or less and a viscosity of about 10 cps or more. The one or more surfactants is selected from the group of one or more cationic surfactants, one or more zwitterionic surfactants, one or more amphoteric surfactants, one or more anionic surfactants, and combinations thereof.

7 Claims, No Drawings

METHODS FOR RECOVERING OIL FROM AN OIL RESERVOIR

CROSS-REFERENCE TO A RELATED APPLICATION

The present application is a continuation of U.S. Ser. No. 11/280,896, filed Nov. 16, 2005, now U.S. Pat. No. 7,461,694 which is incorporated herein by reference in its entirety.

BACKGROUND OF THE INVENTION

1. Field of the Invention

The invention relates to methods for recovering oil from an oil reservoir.

2. Description of the Related Art

Various techniques have been employed to recover crude oil from oil reservoirs (subterranean oil-bearing formations). Primary recovery techniques usually rely on natural reservoir pressure to effect withdrawal or extraction. Secondary recovery techniques typically entail increasing reservoir pressure by introduction (injection) of energy by flooding with water, steam, or gases at a location other than the wellbore but usually in the general direction of the wellbore. When water is introduced, it is referred to as flooding. Oil is then recovered at the wellbore. Tertiary recovery usually entails enhancement of recovery by more sophisticated techniques, such as heating, rheological modification of flooding fluids, and modification of formation and/or pore geometry.

One primary recovery technique involves injecting water through a wellbore into a reservoir to open or fracture it to an extent to yield additional oil. Water may also be used to carry a proppant, such as sand, to aid in keeping open the pores and fractures in the formations after release of water pressure to further enhance oil yield.

In tertiary recovery, fluids of aqueous surfactant solutions/dispersions have been injected during flooding. Certain anionic and nonionic surfactants, such as alkylphenol polyglycol ether sulfonates, oxyalkylated aliphatic alcohols and oxalkylated alkylphenols, have been disclosed as useful for this purpose. The surfactants lower the interfacial surface tension (IFT) of the fluid and enable it to more easily form emulsions mixtures and/or microemulsions with the oil in the reservoir. The formation of mixtures and/or microemulsions dislodge the entrapped oils in the formations through IFT reduction and solubilization of oil in the aqueous surfactant solutions thereby increasing the recovery of oil from subterranean formations. However, the surfactant fluids have less viscosity than the oil, so their effectiveness in pushing the oil from the formations is limited.

To more effectively push oil out of subterranean formations, the viscosity of flooding fluids has been increased by the addition of high molecular weight polymers, such as polyacrylamide (PAM). Such high molecular weight polymers have also been used in combination with conventional anionic surfactants.

A drawback with using conventional anionic surfactants alone in flooding fluids is that their primary physical action is reduction of IFT without significant enhancement of viscosity. A drawback with the use of high molecular weight polymers alone is that they do not reduce IFT. Combining conventional anionic surfactants with high molecular weight polymer to achieve both IFT reduction and viscosity increase requires the use of two different components, which can be expensive and cumbersome. Further, some conventional anionic surfactants can have undesirable interactions with high molecular weight polymers and counteract viscosity enhancement. Still further, high molecular weight polymers commonly adsorb or precipitate out in reservoirs causing damage to the formations and diminution of oil recovery.

It would be desirable to have a flooding fluid and method for use in tertiary oil recovery that employed a single additive or component that effected a significant decrease in IFT and a significant increase in viscosity for the flooding fluid.

SUMMARY OF THE INVENTION

It is an object of the present invention to have a method for recovering oil from a reservoir.

It is further an object of the present invention to have a tertiary method for recovering oil from a reservoir that employed a flooding fluid having a single additive or component that effected a significant decrease in IFT and a significant increase in viscosity in the flooding fluid.

According to these and other objects of the present invention, there is a method for enhancing the recovery of oil from a reservoir. The method has the step of a) introducing a flooding fluid into the reservoir and b) extracting the oil through a wellbore at a location different than the point of introduction of the flooding fluid into the reservoir. The flooding fluid has water and an amount of one or more non-polymeric, viscoelastic surfactants sufficient to provide an interfacial surface tension of about 1 millinewtons per meter (mN/m) or less and a viscosity of about 10 centipoise (cPs) or more at 1 wt % in water having salinity density up to about 20 pounds (lbs)/1000 gallons (gals) of water in organic and/or inorganic salts. The non-polymeric, viscoelastic surfactant(s) is selected from the group of cationic surfactants, zwitterionic surfactants, amphoteric surfactants, anionic surfactants and combinations thereof. The non-polymeric, viscoelastic surfactant(s) are viscoelastic in water, even at high salinity, and up to 350° F.

According to these and other objects of the present invention, there is another method for recovering oil from a reservoir. The method has the steps of a) introducing a fracturing fluid through a wellbore into the reservoir at a pressure sufficient to induce fracturing in the reservoir and b) introducing a flooding fluid into the reservoir at a location different than that of the wellbore. The flooding fluid has water and an amount of one or more non-polymeric surfactants sufficient to provide an oil/water interfacial surface tension of about 1 (mN/m) or less and viscosity of about 10 or more cPs at 1 wt % in water at ambient conditions and at high salinity. The non-polymeric, viscoelastic surfactant(s) is selected from the group of cationic surfactants, zwitterionic surfactants, amphoteric surfactants, anionic surfactants and combinations thereof. The non-polymeric, viscoelastic surfactant(s) are viscoelastic at ambient conditions and at high salinity and temperatures.

DETAILED DESCRIPTION OF THE INVENTION

It was surprisingly found that a single component could be added to a flooding fluid to significantly lower IFT while significantly increasing the viscosity of the injected water during the water flooding process in tertiary oil recovery.

In the methods of the present invention, a flooding fluid having one or more non-polymeric surfactants is introduced, e.g., injected, into the reservoir or formation at elevated pressure for the purpose of pushing or expelling oil from it. Useful surfactants include non-polymeric, viscoelastic cationic, amphoteric, zwitterionic surfactants, and anionic surfactants. Non-polymeric surfactants that form viscosifying aqueous fluids are advantageous because they typically are, as a class, of lower molecular weight than polymers. Amphoteric surfactants have both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic). Zwitterionic surfactants have a permanently positively charged moiety in the molecule regardless of pH and a negatively charged moiety at alkaline pH. Cationic surfactants have a permanently positively charged moeity in the molecule regardless of pH. Anionic surfactants have a permanently negatively charged moiety except at very acidic pH.

The surfactants are present in the flooding fluid at an amount sufficient to provide the flooding fluid (prior to injection into the formation or reservoir) with an interfacial surface tension (IFT) of about 1 mNm or less, preferably about 0.1 mNm or less, and most preferably about 0.01 or less. IFT is determined by spinning drop tensiometer. The surfactants are preferably present in the flooding fluid at an amount about 0.1 to about 10 wt % and most preferably about 0.5 to about 6 wt % based on the total weight of the flooding fluid. The amount of surfactant necessary will vary considerably depending on factors, including surfactant type, brine content in the fluid, and impurities in the flooding fluid. The surfactants are effective in providing the desired levels of IFT even in flooding fluids having high salinity, i.e. up to about 20 lbs/1000 gals concentration. Salts may be organic or inorganic salts, including monovalent, divalent, and trivalent species. Inorganic salts commonly encountered in brackish and salt water include, but are not limited to, chloride and bromide salts of potassium, sodium, calcium, magnesium, zinc, iron, and ammonium.

The non-polymeric, viscoelastic surfactant acts to lower the IFT between the flooding fluid and oil encountered in the formation and increase the viscosity of the injected water during water flooding. The surfactant induces the formation of oil/water mixtures, or, more preferably, microemulsions, as the flooding fluid mixes with oil within the reservoir or formation. At the same time, the surfactant induces a viscosity increase in the flooding fluid to more effectively push and/or transport the oil/water mixture or emulsion through the formation to the wellbore, where it is withdrawn or extracted. The presence of these surfactants in the flooding fluid imparts a markedly higher viscosity compared to a flooding fluid without such viscoelastic surfactants. Higher viscosity in the flooding fluid enhances the capability of pushing or expelling oil from the formation such that the use of conventional polymers, e.g. PAM, may reduced or completely eliminated. The extent of viscosity increase will vary considerably depending on many factors, including surfactant type and amount, brine content in the flooding fluid and in the formation, composition and physical characteristics of the oil in the formation, and impurities in the flooding fluid. The fluiding fluid will have sufficient surfactant present to provide a viscosity of about 10 cPs or more, more preferably about 25 cPs or more, and most preferably about 50 cPs or more. In practice, fluiding fluid viscosities of about 10 cps to about 1000 cps may be employed.

The surfactants useful in the present invention are viscoelastic. Although not bound by any theory, viscoelasticity is believed to be result from a different type of micelle formation than the usual spherical micelles formed by most surfactants. Viscoelastic surfactants form worm-like, rod-like or cylindrical micelles in solution. Viscoelastic surfactants are preferred because they remain stable in high shear applications, i.e., they do not irreversibly degrade under high shear. Fluids having viscoelastic surfactants also exhibit higher conductivity through a reservoir or formation than fluids having non-viscoelastic surfactants.

The property of viscoelasticity in general is well known and reference is made to S. Gravsholt, Journal of Coll. And Interface Sci., 57 (3), 575 (1976); Hoffmann et al., "Influence of Ionic Surfactants on the Viscoelastic Properties of Zwitterionic Surfactant Solutions", Langmuir, 8, 2140-2146 91992); and Hoffmann et al., The Rheological Behavior of Different Viscoelastic Surfactant Solutions, Tenside Surf. Det., 31, 289-400, 1994. Of the test methods specified by these references to determine whether a liquid possesses viscoelastic properties, one test that has been found to be useful in determining the viscoelasticity of an aqueous solution consists of swirling the solution and visually observing whether the bubbles created by the swirling recoil after the swirling is stopped. Any recoil of the bubbles indicates viscoelasticity. Another useful test is to measure the storage modulus (G') and the loss modulus (G") at a given temperature. If G'>G" at some point or over some range of points below about 10 rad/sec, typically between about 0.001 to about 10 rad/sec, more typically between about 0.1 and about 10 rad/sec, at a given temperature and if $G'>10^{-2}$ Pascals, preferably $10^{-1}$ Pascals, the fluid is typically considered viscoelastic at that temperature. Rheological measurements such as G' and G" are discussed more fully in "Rheological Measurements", Encyclopedia of Chemical Technology, vol. 21, pp. 347-372, (John Wiley & Sons, Inc., N.Y., N.Y., 1997, 4th ed.). The above disclosures are expressly incorporated herein by reference.

Viscoelastic cationic surfactants useful in the present invention include those selected from i) certain quaternary salts and ii) certain amines, iii) certain amine oxides, iv) and combinations thereof. Representative cationic surfactants are set forth below.

The quaternary salts have the structural formula:

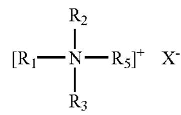

wherein $R_1$ is a hydrophobic moiety of alkyl, alkylarylalkyl, alkoxyalkyl, alkylaminoalkyl or alkylamidoalkyl, and wherein $R_1$ has from about 16 to about 22 carbon atoms and may be branched or straight-chained and saturated or unsaturated.

$R_2$ and $R_3$ are, independently, i) an aliphatic group or ii) an aliphatic group with an aromatic or benzylic moiety bonded therewith. $R_2$, $R_3$, and $R_5$ have from 1 to about 20 atoms. The aliphatic group can be branched or straight-chained and saturated or unsaturated. $R_2$, $R_3$, and $R_5$ can be, for example, alkyl, oxyalkyl, polyoxyalkyl, alkoxy, and alkylaryl. Preferably, $R_2$, $R_3$, and $R_5$ are alkyl groups. Most preferably, $R_2$, $R_3$, and $R_5$ are methyl or ethyl groups.

X is suitable counter-anion, such as $Cl^-$, $Br^-$, and $CH_3CH_3SO_4^-$

The amines have the following structural formula:

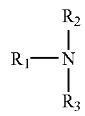

wherein $R_1$, $R_2$ and $R_3$ are as defined above.

Representative amines of the above structure include polyoxyethylenated (2-15) cocoalkylamines, polyoxyethylenated (12-18) tallow alkylamines, and polyoxyethylenated (2-15) oleyl and erucyl amines Examples of nonpolymeric, viscoelastic anionic surfactants useful in the present invention are represented by the formulas (I) to (V):

$$ROSO_3^- \quad \text{(I)}$$

$$R(OCHR'CHR')_mOSO_3^- \quad \text{(II)}$$

$$RSO_3^- \quad \text{(III)}$$

$$R(OCHR'CHR')_mSO_3^- \quad \text{(IV)}$$

$$RC_6H_4\text{—}SO_3^- \quad \text{(V)}$$

wherein R represents an alkyl, alkenyl, arylalkyl, or hydroxyalkyl group. R has about 16 to about 24 carbon atoms and more preferably about 16 to about 20 carbon atoms. R may be saturated or unsaturated, branched or straight chained, wherein branch alkyl groups have from 1 to about 6 carbon atoms. Representative alkyl groups for R include decyl, dodecyl, tetradecyl (myristyl), hexadecyl (cetyl), octadecyl (oleyl), stearyl, erucyl, and the derivatives of coco, tallow, soy, and rapeseed oils. The number of alkylene oxide groups, m, ranges from 0 to about 35 and more preferably 0 to about 10.

Examples of nonpolymeric, viscoelastic zwitterionic surfactants useful in the present invention are represented by the formula:

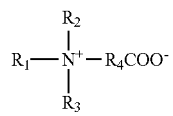

wherein $R_1$ represents a hydrophobic moiety of alkyl, alkylarylalkyl, alkoxyalkyl, alkylaminoalkyl and alkylamidoalkyl, wherein alkyl represents a group that contains from about 16 to about 24 carbon atoms which may be branched or straight chained and which may be saturated or unsaturated. Representative long-chain alkyl groups include tetradecyl (myristyl), hexadecyl (cetyl), octadecenyl (oleyl), octadecyl (stearyl), docosenoic (erucyl) and the derivatives of tallow, coco, soya and rapeseed oils. The preferred alkyl and alkenyl groups are alkyl and alkenyl groups having from about 16 to about 22 carbon atoms. Representative of alkylamidoalkyl is alkylamidopropyl with alkyl being as described above.

$R_2$ and $R_3$ are independently an aliphatic chain (i.e. as opposed to aromatic at the atom bonded to the quaternary nitrogen, e.g., alkyl, alkenyl, arylalkyl, hydroxyalkyl, carboxyalkyl, and hydroxyalkyl-polyoxyalkylene, e.g. hydroxyethyl-polyoxyethylene or hydroxypropyl-polyoxypropylene) having from 1 to about 30 carbon atoms, preferably from about 1 to about 20 carbon atoms, more, preferably from about 1 to about 10 carbon atoms and most preferably from about 1 to about 6 carbon atoms in which the aliphatic group can be branched or straight chained, saturated or unsaturated. Preferred alkyl chains are methyl, ethyl, preferred arylalkyl is benzyl, and preferred hydroxyalkyls are hydroxyethyl or hydroxypropyl, while preferred carboxyalkyls are acetate and propionate. Preferred hydroxyalkyl-polyoxyalkylenes are hydroxyethyl-polyoxyethylene and hydroxypropyl-polyoxyethylene.

$R_4$ is a hydrocarbyl radical (e.g. alkylene) with chain length 1 to 4. Preferred are methylene or ethylene groups.

Specific examples of viscoelastic zwitterionic surfactants include the following structures:

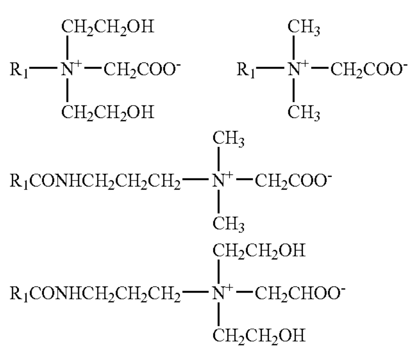

wherein $R_1$ has been previously defined herein.

Another example of a viscoelastic zwitterionic surfactant selected is an amine oxide. This material has the following structure:

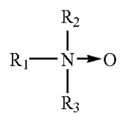

wherein $R_1$, $R_2$, and $R_3$ are as defined above.

Other representative zwitterionic surfactants include dihydroxyethyl tallow glycinate, propionates, oleamidopropyl betaine, and erucyl amidopropyl betaine.

Examples of nonpolymeric, viscoelastic amphoteric surfactants include those represented by the following:

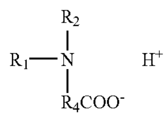

wherein $R_1$, $R_2$, and $R_4$ are the same as defined above.

Other specific examples of viscoelastic amphoteric surfactants include the following structures:

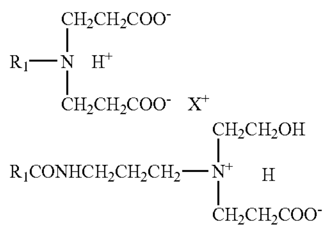

wherein $R_1$ has been previously defined herein, and $X^+$ is an inorganic cation such as $Na^+$, $K^+$, $NH_4^+$ associated with a carboxylate group or hydrogen atom in an acidic medium.

Useful viscoelastic zwitterionic and amphoteric surfactants include those disclosed in U.S. Pat. No. 6,831,108 B2, which is incorporated herein by reference.

In the methods of the present invention, a flooding fluid having one or more non-polymeric, viscoelastic surfactants is introduced, e.g., injected, into the reservoir or formation at elevated pressure for the purpose of pushing or expelling oil from it. The point or location of introduction of the flooding fluid is different than the location of the wellbore, the point at which oil is extracted or withdrawn from the reservoir. The direction of flooding will typically be directed to an area or location in the field that will afford efficient extraction or withdrawal of oil. Most typically, the direction of flooding will be toward the vicinity of the wellbore or to wells or passages in the formation affording efficient extraction or withdrawal.

The flooding fluid optionally has one or more members from the group of organic acids, organic acid salts, and inorganic acids, and inorganic salts. The organic acid or salt thereof aids in the development of increased viscosity. Since brackish water is frequently used as a flooding fluid in the oilfield, salt content at some level may already present.

Useful organic acids are typically those of a sulfonic acid or a carboxylic acid. Anionic counter-ions of the organic acid salts are typically sulfonates or carboxylates. Representative of such organic molecules include aromatic sulfonates and carboxylates such as p-toluene sulfonate, naphthalene sulfonate, chlorobenzoic acid, salicylic acid, phthalic acid and the like, wherein such counter-ions are water-soluble. Most preferred are salicylate, phthalate, p-toluene sulfonate, hydroxynaphthalene carboxylates, e.g. 5-hydroxy-1-napthoic acid, 6-hydroxy-1-naphthoic acid, 7-hydroxy-1-napthoic acid, 1-hydroxy-2-naphthoic acid, preferably 3-hydroxy-2-naphthoic acid, 5-hydroxy-2-naphthoic acid, 7-hydroxy-2-napthoic acid, and 1,3-dihydroxy-2-naphthoic acid and 3,4-dichlorobenzoate. The organic acid or salt thereof will optionally be present in the flooding fluid at from about 0.1 wt % to about 10 wt %, more typically from about 0.1 wt % to about 7 wt %, and even more typically from about 0.1 wt % to about 6 wt % based on the total weight of the flooding fluid.

Useful inorganic salts include water-soluble potassium, sodium, and ammonium salts, such as potassium chloride and ammonium chloride. Additionally, calcium chloride, calcium bromide and zinc halide salts may also be used. The inorganic salt is optionally present in the flooding fluid at a weight concentration of from about 0.1 wt % to about 30 wt %, more typically from about 0.1 wt % to about 10 wt %, and even more typically from about 0.1 wt % to about 8 wt %. Organic salts, e.g. trimethylammonium hydrochloride and tetramethylammonium chloride, may also be used in addition to, or as a replacement for, the inorganic salts.

The component of the flooding fluid that is present in the greatest concentration is water. Typically, water will be a major amount by weight of the fluid. Water is typically present in an amount by weight about 50% or more and more typically about 80% or more by weight of the fluid. The water can be from any source so long as the source contains no contaminants that are chemically or physically incompatible with the other components of the fluid (e.g., by causing undesirable precipitation). The water need not be potable and may be brackish and contain salts of such metals as sodium, potassium, calcium, zinc, magnesium, etc or other materials typical of sources of water found in or near oil fields.

Optionally, natural or synthetic polymers may be added to the flooding fluid to regulate viscosity. Useful polymers include, but are not limited to, guar and guar derivatives, xanthan, polyacrylamide (PAM), starch and starch derivatives, cellulosic derivatives, and polyacrylates.

The flooding (or fracturing) fluid may optionally contain a gas such as air, nitrogen or carbon dioxide to provide an energized fluid or foam. Supercritical carbon dioxide emulsion can be also present.

Optionally, nonviscoelastic surfactants, polymeric or non-polymeric, can be added to the flooding fluid to impart additional IFT reduction and/or modify viscosity. The nonviscoelastic surfactants complex with the viscoelastic surfactants to impact IFT and/or viscosity. Useful nonviscoelastic surfactants can be anionic, cationic, nonionic, zwitterionic/amphoterics and combinations thereof. When present, the nonviscoelastic surfactants will preferably be present in limited amounts, i.e., about 0.5% or less, more preferably about 0.2% or less, and even more preferably 0.1% or less by weight based on the total weight of the flooding fluid.

The method of the present invention may optionally be preceded by a hydraulic fracturing step. In hydraulic fracturing, a fracturing fluid, such as water, is injected through a wellbore and against the face of the formation at a pressure and flow rate sufficient to overcome the overburden pressure of the formation and initiate and/or extend a fracture(s) into the formation. The fracturing fluid optionally carries a proppant, such as 20-40 mesh sand, bauxite, glass beads, etc., which is suspended in the fracturing fluid and transported into a fracture. The proppant prevents the formation from closing back down on itself when the pressure is released. The proppant-filled fractures provide permeable channels through which the formation fluids can flow to the wellbore and thereafter be extracted or withdrawn.

It should be understood that the foregoing description is only illustrative of the present invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method flooding an oil-bearing reservoir, comprising:

a) introducing a flooding fluid into the reservoir, wherein the fluid has
   i) water and
   ii) an amount of one or more non-polymeric, viscoelastic surfactants sufficient to provide the flooding fluid with an oil/water interfacial surface tension of about 1 mN/m or less and a viscosity of about 10 cPs or more, wherein the one or more non-polymeric, viscoelastic surfactants includes one or more anionic surfactants;

b) pushing oil through the reservoir to the vicinity of a wellbore at a location different than the point of introduction of the flooding fluid into the reservoir; and c) extracting the oil through the wellbore, wherein the one or more anionic surfactants is selected from the group consisting of formulas (I), (II), and (III):

$$ROSO_3^- \quad (I)$$

$$RSO_3^- \quad (II)$$

$$RC_6H_4\text{—}SO_3^- \quad (III)$$

wherein R represents an alkyl, alkenyl, arylalkyl, or hydroxyalkyl group; wherein R has about 16 to about 24 carbon atoms; wherein R is saturated or unsaturated, branched or straight chained; and wherein branched alkyl groups have from 1 to about 6 carbon atoms.

2. The method of claim 1, wherein the flooding fluid has about 0.1 wt% to about 20 wt% of the one or more non-polymeric surfactants.

3. The method of claim 1, wherein the flooding fluid has about 0.5 wt% to about 10 wt% of the one or more non-polymeric surfactants.

4. The method of claim 3, wherein the flooding fluid has an amount of the one or more surfactants sufficient to provide a flooding fluid having an interfacial surface tension of about 0.1 mN/m or less.

5. The method of claim 1, wherein the flooding fluid has up to about 20 lbs/1000 gals water of organic and inorganic salts.

6. The method of claim 1, wherein the flooding fluid has an amount of the one or more surfactants sufficient to provide a flooding fluid having an interfacial surface tension of about 0.1 mN/m or less.

7. The method of claim 1, wherein R has 16 to about 24 carbon atoms.

* * * * *

UNITED STATES PATENT AND TRADEMARK OFFICE

CERTIFICATE OF CORRECTION

PATENT NO. : 7,789,144 B2
APPLICATION NO. : 12/290392
DATED : September 7, 2010
INVENTOR(S) : Manilal S. Dahanayake et al.

It is certified that error appears in the above-identified patent and that said Letters Patent is hereby corrected as shown below:

Title Page
At Section (75), please delete "Bruno Langlois" and "Paul-Joel Derian".

Signed and Sealed this
Thirteenth Day of September, 2011

David J. Kappos
*Director of the United States Patent and Trademark Office*